United States Patent [19]
Moroda

[11] Patent Number: 6,029,003
[45] Date of Patent: *Feb. 22, 2000

[54] METHOD OF ASSIGNING EXTERNAL VARIABLES TO MEMORIES WHEN COMPILING SOURCE PROGRAM

[75] Inventor: Takahiro Moroda, Tokyo, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/681,761

[22] Filed: Jul. 29, 1996

[30] Foreign Application Priority Data

Jul. 28, 1995 [JP] Japan ................................ 7-193572

[51] Int. Cl.⁷ ........................................... G06F 9/44
[52] U.S. Cl. ............................................... 395/709
[58] Field of Search ..................... 395/701, 705, 395/706, 708, 685, 703, 702, 709, 707; 364/578

[56] References Cited

U.S. PATENT DOCUMENTS

| | | |
|---|---|---|
| 4,571,678 | 2/1986 | Chaitin . |
| 5,471,408 | 11/1995 | Takamoto et al. .................. 364/578 |
| 5,530,866 | 6/1996 | Koblenz et al. .................. 395/708 |
| 5,613,117 | 3/1997 | Davidson et al. .................. 395/708 |
| 5,642,512 | 6/1997 | Tanaka et al. .................. 395/705 |

FOREIGN PATENT DOCUMENTS

| | | |
|---|---|---|
| 0 229 245 A3 | 7/1987 | European Pat. Off. . |
| 0 650 121 A2 | 4/1995 | European Pat. Off. . |
| 2-144629 | 6/1990 | Japan . |
| 4-311227 | 11/1992 | Japan . |
| 7-10513 | 4/1995 | Japan . |

OTHER PUBLICATIONS

Patent Abstracts of Japan, vol. 14, No. 385, Aug. 20 1990 JPA 02 144629, Jun. 4, 1990.
Boddie, et al. (1988) "A 32–Bit Floating–Point DSP with C Compiler", 22ACSSCX, XP000130373:880–884.
Proebstring et al. (1992) "Probabilistic Register Allocation", ACM SIGPLAN '92, XP000332449:300–310.
"Papers from the 47th Conference of Information Processing Society of Japan (late 1993)", pp. 5–85–86.

*Primary Examiner*—Emanuel Todd Voeltz
*Assistant Examiner*—Matthew B. Smithers
*Attorney, Agent, or Firm*—Scully, Scott, Murphy & Presser

[57] ABSTRACT

In order to reduce a run time of an object program executable with a microcomputer having a fast internal RAM, the number of occurrences of each external variable in a source program is ascertained when compiling the source program. Further, the locations of first and last occurrences of each external variable are also ascertained. Thereafter, one or more external variables are determined as being assignable to the internal RAM on a basis of the number of occurrences of each external variable. Subsequently, a variable assignment information file is generated which indicates the external variable(s) to be assigned to the internal RAM and which further indicates the locations of first and last occurrences of each external variable determined to be assigned to the internal RAM.

13 Claims, 7 Drawing Sheets

SOURCE PROGRAM

```
1:    int i, a1, a2, a3;
2:    void main ( );
3:    {
4:        a1=a2+1;
5:        for (i=0;i<50;i++)
6:        {
7:         a3++;
8:        }
9:        a1=a1+a3;
10:   }
```

FIG. 4B

| VARIABLES APPEARING IN SOURCE PROGRAM | THE NUMBER OF OCCURRENCES OF VARIABLE IN SOURCE PROGRAM | LOCATIONS OF FIRST AND LAST OCCURRENCES OF VARIABLE IN SOURCE PROGRAM |
|---|---|---|
| i | 50 | 5th line (FIRST)<br>8th line (LAST) |
| a1 | 2 | 4th line (FIRST)<br>9th line (LAST) |
| a2 | 1 | 4th line (FIRST)<br>4th line (LAST) |
| a3 | 51 | 5th line (FIRST)<br>9th line (LAST) |

FIG. 4C

| VARIABLE TO BE ASSIGNED TO INTERNAL RAM | LOCATION OF ASSIGNMENT OF VARIABLE TO INTERNAL RAM IN SOURCE PROGRAM | LOCATION OF CANCELING ASSIGNMENT OF VARIABLE TO INTERNAL RAM IN SOURCE PROGRAM |
|---|---|---|
| i | AFTER LINE 4 | AFTER LINE 8 |
| a3 | AFTER LINE 4 | AFTER LINE 9 |

FIG. 4D

OBJECT PROGRAM

```
 1: _main
 2:      ld     E_a2, r10
 3:      add    1, r10
 4:      st     r10, E_a1
 5:      st     r0, E_i
 6:      ld     E_i, r10
 7:      st     r10, I_i
 8:      ld     E_a3, r10
 9:      st     r10, I_a3
10: loop:
11:      ld     I_a3, r12
12:      add    1, r12
13:      st     r12, I_a3
14:      ld     I_i, r13
15:      add    1, r13
16:      st     r13, I_i
17:      ld     I_i, r14
18:      cmp    50, r14
19:      jlt    loop
20:      ld     I_i, r10
21:      st     r10, E_i
22:      ld     E_a1, r15
23:      ld     I_a3, r16
24:      add    r16, r15
25:      st     r15, E_a1
26:      ld     I_a3, r10
27:      st     r10, E_a3
```

FIG. 5

| INSTRUCTION | The number of bytes in machine language set | The number of clocks for execution |
|---|---|---|
| ld     E_label, register | 4 bytes | 7 clocks |
| ld     I_label, register | 4 bytes | 1 clock |
| st     register, E_label | 4 bytes | 7 clocks |
| st     register, I_label | 4 bytes | 1 clock |
| add    integer, register | 2 bytes | 1 clock |
| add    register, register | 2 bytes | 1 clock |
| cmp    integer, register | 2 bytes | 1 clock |
| jit     label | 2 bytes | 1 clock |

METHOD OF ASSIGNING EXTERNAL VARIABLES TO MEMORIES WHEN COMPILING SOURCE PROGRAM

BACKGROUND OF THE INVENTION

1. Field of the Invention

The present invention relates generally to improvements in compiling a source program in a digital data processing system, and more specifically to a method of assigning one or more external variables to a fast internal RAM (random access memory) provided in a microcomputer when compiling a source program. An object program thus generated features a markedly short run time compared with conventional ones.

2. Description of the Related Art

As is well known in the art, a microcomputer contains not only a CPU (central processing unit) logic but also memories for storing programs and data, I/O (input/output) interfaces for exchanging data with peripheral devices, and timing circuits for controlling the flow of data in the computer system. There are already dozens of different single-chip microcomputers available on the market.

Throughout the instant disclosure, the C language is referred to for discussing the present invention. However, this usage is merely exemplary and the invention is in no way limited to any particular compiler.

A microcomputer user, who obtains an object program using a compiler, is highly desirous for the compiled program to be fast in execution. On the other hand, it is a current tendency to provide a fast internal RAM in a microcomputer in order to effectively increase the system operation time within the microcomputer. However, a memory capacity of the internal RAM, which is available (viz., allocatable) to the user, is strictly limited.

A currently known approach to assigning external variables to the internal RAM is to add an identification (ID) code to external variables declared in a source program before compiling the same. That is, it is necessary for a programmer to attach the ID code (such as "hr") to the external variables which are to be assigned to the internal RAM. Therefore, a programmer must always exercise care that a resultant object program does not exceed the memory capacity assigned to the application program within the internal RAM. Further, it is very awkward that the programmer is required to attach the ID code to the variables every time the programmer prepares a source program. The above mentioned known techniques is disclosed in Japanese Laid-open Patent Application No. 2-144629.

Another known approach to assigning external variables to the internal RAM is to automatically assign the variables in order of occurrences in a source program as long as a RAM capacity assigned to a user permits. As a result, this approach has encountered the problem that an external RAM which is not expected to effectively increase the run time of a resultant object program, is undesirably assigned to the internal RAM. This known technique is disclosed in a paper entitled "User's Manual, CC78K4 Series C Compiler, Operation", Document No. U11572EJ1V0UM00 (1st edition) published by NEC Corporation, May 1996.

SUMMARY OF THE INVENTION

It is therefore an object of the present invention to provide a method of automatically assigning external variables in a source program to a fast internal RAM provided in microcomputer in a manner which is most suitable for increasing a run time of a resultant object program.

These objects are fulfilled by a technique wherein in order to reduce a run time of an object program executable with a microcomputer having a fast internal RAM, the number of occurrences of each external variable in a source program is ascertained when compiling the source program. Further, the locations of first and last occurrences of each external variable are also ascertained. Thereafter, one or more external variables are determined as being assignable to the internal RAM on a basis of the number of occurrences of each external variable. Subsequently, a variable assignment information file is generated which indicates the external variable(s) to be assigned to the internal RAM and which further indicates the locations of first and last occurrences of each external variable determined to be assigned to the internal RAM.

More specifically, one aspect of the present invention resides in a method of assigning external variables declared in a source program to an internal RAM provided in a microcomputer when compiling the source program, the method comprising the steps of: (a) ascertaining a number of occurrences of each external variable in a source program, and ascertaining locations of first and last occurrences of the each external variable; (b) determining one or more external variables to be assigned to the internal RAM on a basis of the number of occurrences of each external variable; and (c) generating variable assignment information which indicates the one or more external variables assigned to the internal RAM and which indicates the locations of first and last occurrences of each external variable determined to be assigned to the internal RAM at step (b).

Another aspect of the present invention resides in a method of assigning external variables declared in a source program to an internal RAM provided in a microcomputer when compiling the source program, the method comprising the steps of: (a) ascertaining a number of occurrences of each external variable in a source program, and ascertaining locations of first and last occurrences of the each external variable; (b) determining one or more external variables, which are unsuitable to be assigned to the internal RAM, on a basis of the number of occurrences of the each external variable; (c) determining one or more external variables to be assigned to the internal RAM on a basis of the number of occurrences of each external variable; and (d) generating variable assignment information which indicates the one or more external variables assigned to the internal RAM and which indicates the locations of first and last occurrences of each external variable determined to be assigned to the internal RAM at step (b).

Still another aspect of the present invention resides in a method of assigning external variables declared in a source program to an internal RAM provided in a microcomputer when compiling the source program, the method comprising the steps of: (a) ascertaining a number of occurrences of each external variable in a source program, and ascertaining locations of first and last occurrences of the each external variable; (b) determining one or more external variables, which are unsuitable to be assigned to the internal RAM, on a basis of the number of occurrences of the each external variable; (c) determining one or more external variables to be assigned to the internal RAM on a basis of the number of occurrences of each external variable and on a basis of a memory size available to the compiled source program within the internal RAM; and (d) generating variable assignment information which indicates the one or more external variables assigned to the internal RAM and which indicates the locations of first and last occurrences of each external variable determined to be assigned to the internal RAM at step (b).

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

Prior to turning to a preferred embodiment of the present invention, a known 32-bit type single-chip microcomputer to which the present invention is applicable is described with reference to FIG. 1. It is to be noted that the microcomputer of FIG. 1 is exemplary and thus the present invention is in no way limited thereto.

Figure 1:
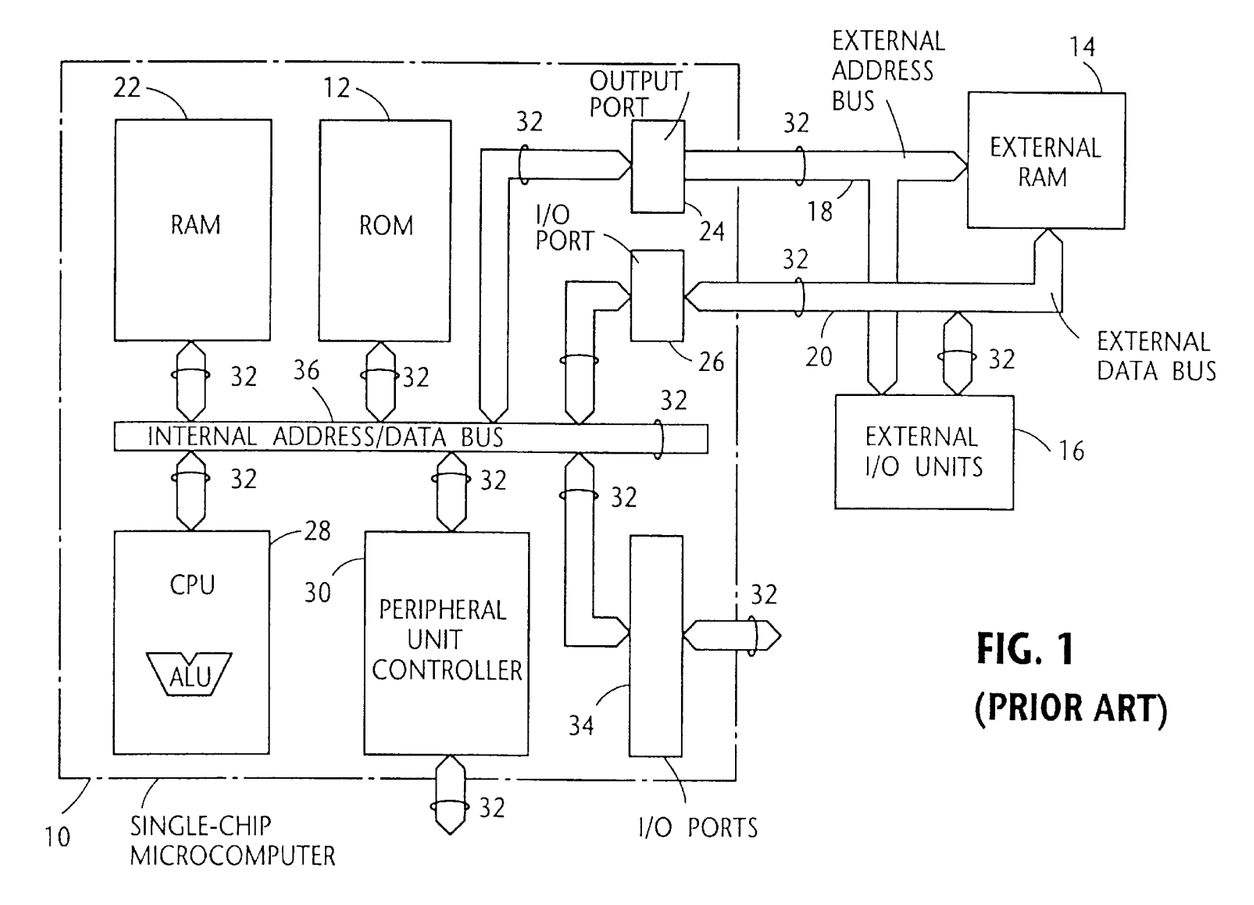
FIG. 1 is a block diagram schematically showing a 32-bit type single-chip microcomputer and its peripheral units, to which the prevent invention is applicable.

FIG. 1 shows in block diagram form the above mentioned microcomputer (denoted by numeral 10) in which an object program is stored in a ROM (random access memory) 12 and executed. The microcomputer 10 is connected to an external RAM 14 and an external 1/0 units 16 by way of external buses 18 and 20, respectively.

The microcomputer 10 comprises, in addition to the above-mentioned ROM 12, an internal RAM 22 including a plurality of general purpose registers (not shown), an output port 24 through which an address signal is outputted, and I/O port 26 which allows input and output of a 32-bit data. The microcomputer 10 further comprises a CPU (central processing unit) 28 having therein an ALU (arithmetic logic unit), a peripheral unit controller 30 with A/D (analog-to-digital) converters and an interrupt controller (both not shown), and an I/O ports 34. The blocks in the microcomputer 10 are interconnected by a 32-bit address/data bus 36.

The operation of the microcomputer 10 itself is not relevant to the present invention and is readily understandable to those skilled in the art. Therefore, further description thereof is omitted for the sake of simplifying the disclosure.

As referred to in the opening paragraphs, the memory size of the internal RAM 22, which is available to the object program (viz., user), is very limited. By way of example, it is assumed that: (a) the total memory size of the internal RAM 22 is about 8,000 bits (viz., 1,000 bytes) and (b) the internal RAM size which can be assigned to the compiled program is limited to as small as 96(=32×3) bits. That is to say, under the above assumption, only three external variables are concurrently allocatable to the internal RAM 20.

The present invention relates to the C compiler which initially assigns all the external variables to the external RAM 14. Therefore, according to the present invention, when a given external variable is determined to be assigned to the internal RAM 22, the given variable is transferred to (viz., assigned to) the internal RAM 22 until the assignment to the internal RAM 22 is canceled.

The preferred embodiment of the present invention will be described with reference to FIGS. 2 through 5.

Figure 2:
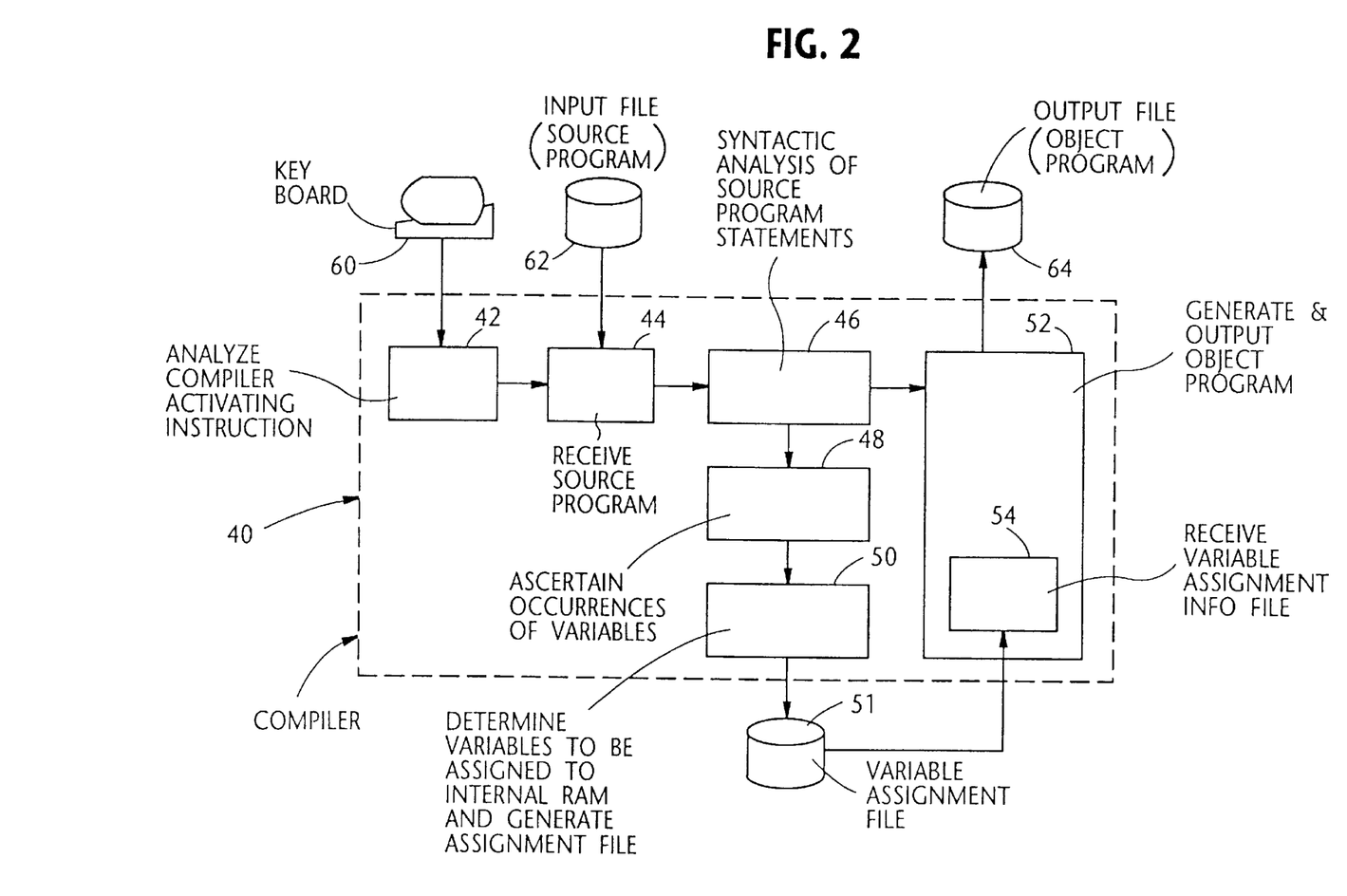
FIG. 2 is a block diagram schematically showing a general compiling process according to the present invention.

FIG. 2 is a block diagram schematically showing a general compiling process embodying the present invention.

In FIG. 2, a compiler 40 enclosed by a broken line is illustrated such that the functions of the compiler 40 are split into a plurality of function blocks 42, 44, 46, 48, 50, 52 and 54 only for the convenience of description. The function block 42 analyzes a compiler activating instruction which is applied from a suitable man-machine interface such as keyboard 60 or a mouse. The compiler 40 is previously located in an appropriate region of a suitable memory of the computer system in question. Upon completion of analyzing the activating instruction at the function block 42, the function block 44 begins to read a source program stored in an input file 62 into the compiler 40.

The source program statements located in the memory region of the compiler 40, undergo syntactic analysis at the function block 46 in a manner well known in the art.

The blocks 44, 46, 48 and 50 of FIG. 2 are described in detail in terms of functions thereof with reference to FIGS. 3, 4A–4D.

Figure 3:
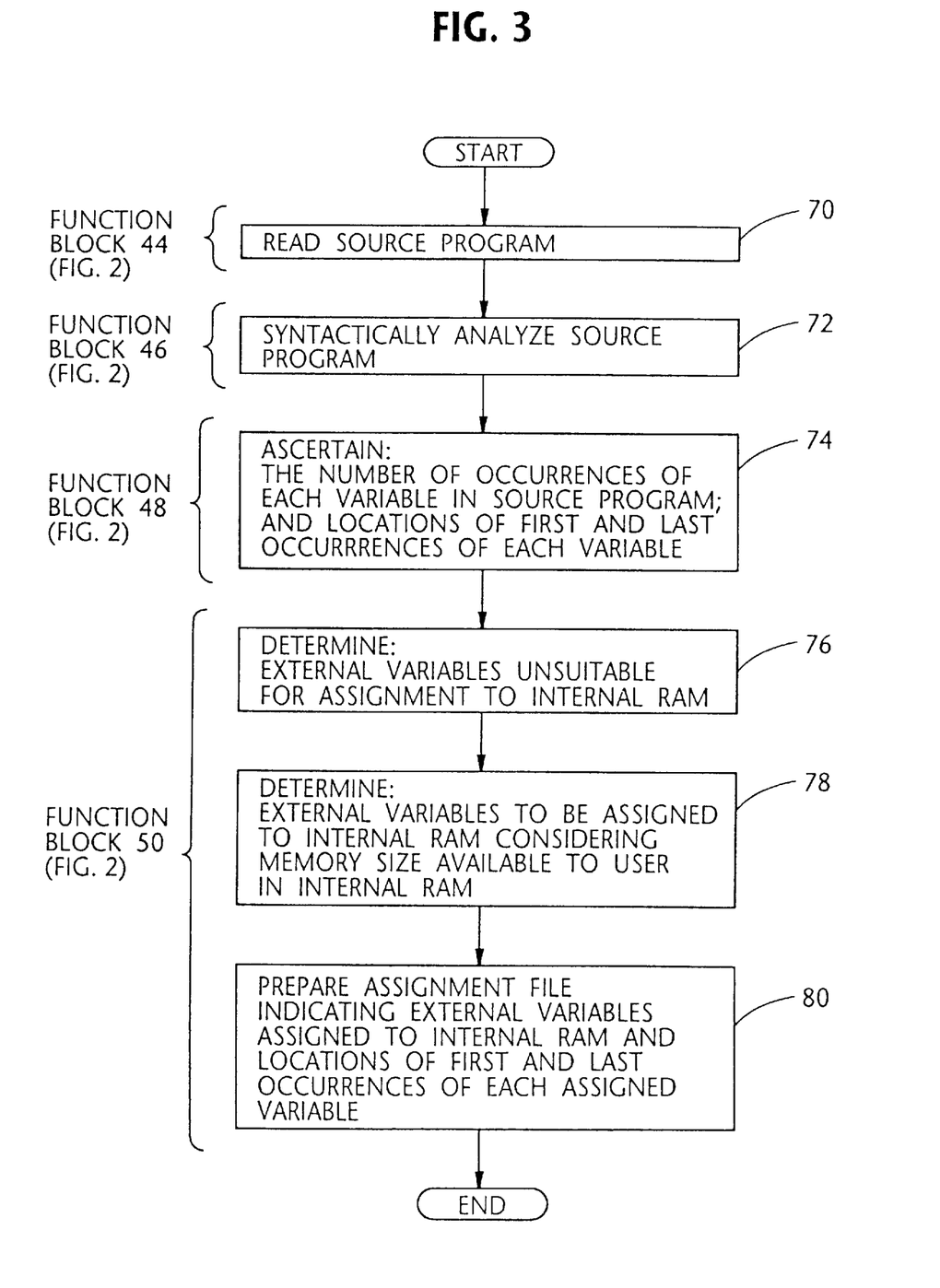
FIG. 3 is a flow chart which shows the steps which characterize the operation of the present invention as applied to the blocks of FIG. 2.

In FIG. 3, at step 70, the source program is read from the input file 62. The source program thus read by the compiler 40 is stored in a suitable memory region (not shown) assigned to the compiler 40 for the succeeding processes.

Figure 4A:
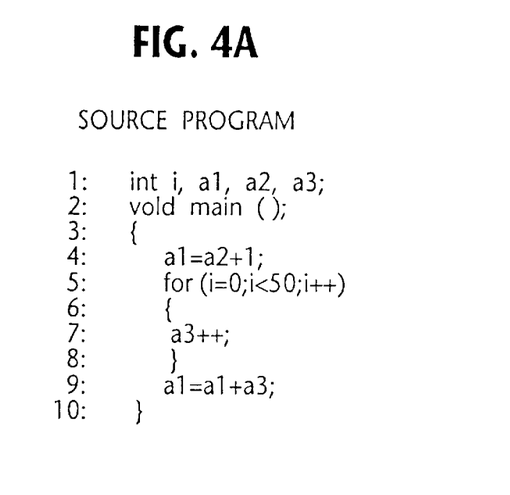
FIG. 4A is a list showing source program statements written in the C language for discussing the present invention.
Figure 4B:
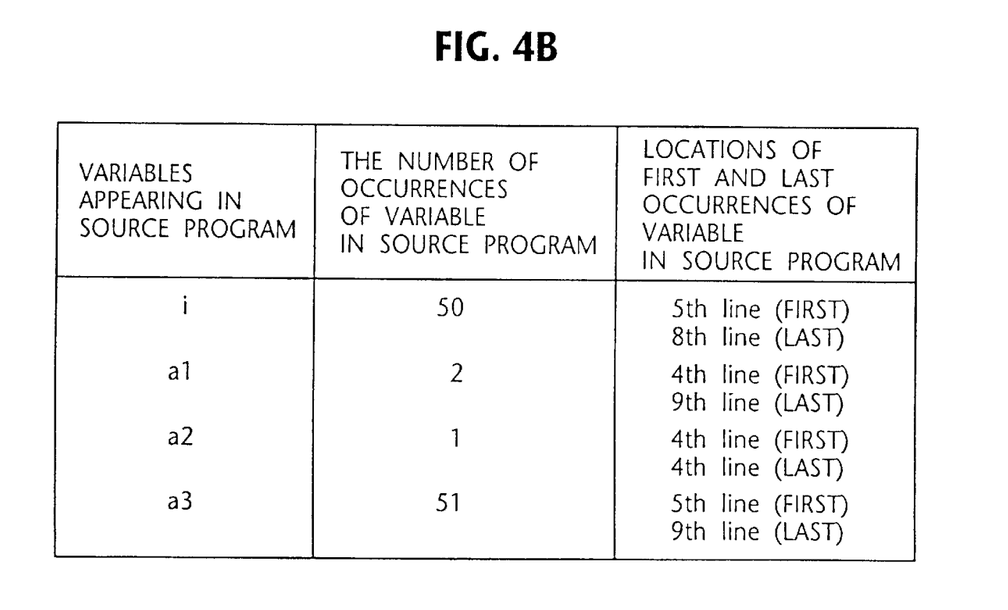
FIG. 4B is a list showing external variables appearing in the source program together with the manner of occurrences thereof.
Figure 4C:
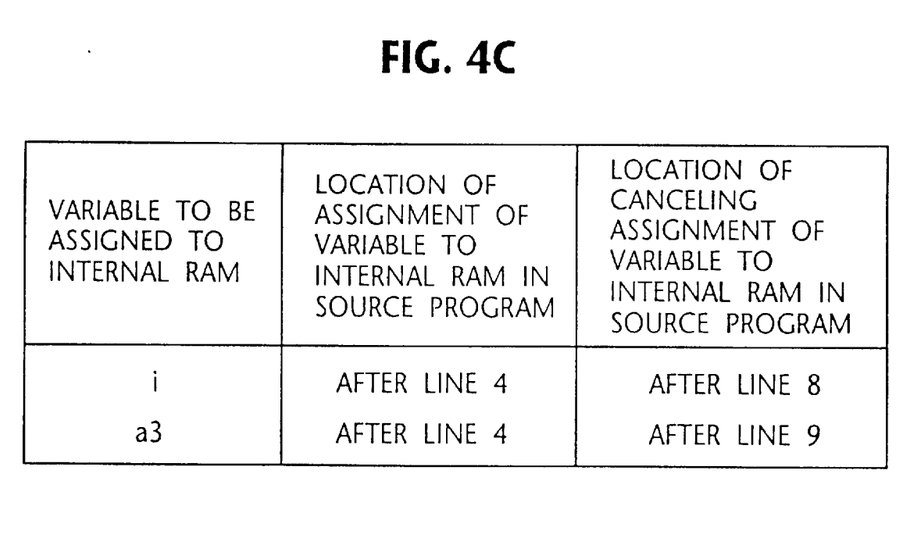
FIG. 4C is a list showing external variables to be assigned to the internal RAM.

FIG. 4A is a list of source program statements written in the C language for describing the instant embodiment. In FIG. 4A, the first line is a variable declaration line in which four external variables "i", "a1", "a2" and "a3" are declared as integer variables in this example. The code "void" in the second line is one of the data types usually used to type the return value of a function that returns nothing, while "main( )" in the same line is a function with which an operation system will start executing. The symbols or braces "{" and "}" in lines 3, 6, 8 and 10 defines executable statements enclosed thereby as is well known in the art. The line 4 of the source program shows an executable statement of a1=a2+1, while the line 5 shows a "for statement" whose execution unit is defined at the line 7. That is, the content of the external variable a3 is incremented by one fifty (50) times, which is clearly understood from the "for statement" listed in the line 5. In this case, the variable "min" acts as a counter. The line 9 of the source program shows an executable statement of a1=A1+a3.

At step 72 of FIG. 3, the source program statements located in the memory region of the compiler 40, undergo syntactic analysis at the function block 46.

At step 74 of FIG. 3, the source program syntactically analyzed in the function block 46 is sent to a function block 48 wherein the occurrences of all the external variables in the source program are ascertained or checked. In this regard, it is necessary to provide a working space in a suitable memory to investigate all the variables in the source program. However, the hardware of such memory section is not shown in the accompanying drawings for simplifying the same. More specifically, at the block 48, the number of occurrences of each variable in the source program is ascertained (viz., determined). Additionally, at the block 48, the locations of first and last occurrences of each variable are defined. The results obtained at the block 48 (viz., at step 74 of FIG. 3) are listed in FIG. 4B. The results thus derived are then applied to the block 50 of FIG. 2.

The functions of the block 50 are described with reference to steps 76, 78 and 90 shown in FIG. 3.

At step 76, the external variables which are not suitable for assignment to the internal RAM 22 (FIG. 1) are determined. As mentioned above, all the external variables declared in the source program are initially assigned to the external RAM 14. This means that if a given external variable occurs very small times (less than five (for example)), it is not expected to effectively shorten the execution time thereof even if the given external variable is allocated to the internal RAM 22. Therefore, in this embodiment, in the case where the number of occurrences of an external variable is less than five, the variable is not assigned to the internal RAM 42. It is understood from FIG. 4B that the two variable "a1" and "a2" are determined as unsuitable for assignment to the internal RAM 22.

At step 78, the external variables to be assigned to the internal RAM 22 are determined on a basis of the results obtained at step 76. This implies that the two variables "i" and "a3" are selected so as to be assigned to the internal RAM 22. In this case, a RAM memory size, which is available to a programmer in the internal RAM 22, should be considered. As mentioned above, a maximum of three variables can be assigned by way of example.

Thereafter, at step 80, an variable assignment file is prepared (generated) which indicates the external variables assigned to the internal RAM 22 and the locations of first and last occurrences of each assigned variable. The variable assignment file prepared at step 80 (viz., in the function block 50 (FIG. 2)) is sent to the block 51 (i.e., a suitable file memory (not shown)).

After the variable assignment file has been stored in the block 51, the function block 52 initiates to generate an object program by referring to the assignment file which is received at the block 54. It is to be noted that the block 52 should wait for the completion of the variable assignment file. To this end, by way of example, the block 52 receives the syntactically analyzed source program via one or more buffer registers (not shown).

Figure 4D:
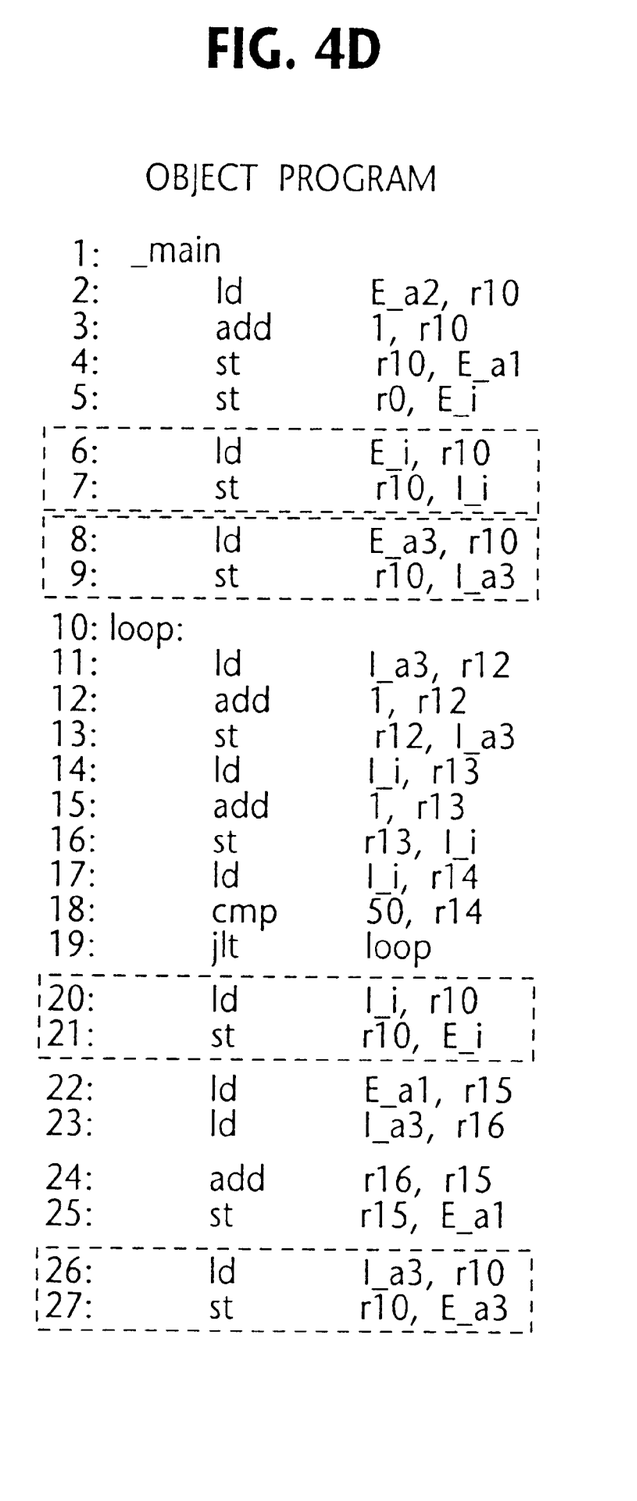
FIG. 4D is a list showing assembler codes (viz., object program) generated from the source program taking the data of FIG. 4C into account.

FIG. 4D shows a list of the object program which is generated at the block 52 and stored in an output file 64.

In FIG. 4D, an instruction code "ld" indicates that the content of a first mnemonic operand is loaded into a second mnemonic operand, while an instruction code "add" instructs that a first mnemonic operand is added to a second mnemonic operand. Further, an instruction "st" indicates that a first mnemonic operand is stored into a second mnemonic operand. An instruction "cmp" indicates that first and second mnemonic operands are compared. In this case, if the first operand is larger than the second one, the program routine goes to next line (viz., "jlt") and jumps to the line indicated by "loop". Otherwise, the routine exits the loop and executes the line 20 in this particular case. The notation "E_" indicates that the following variable is present in the external RAM, while the notation "I_" indicates that the following variable is located in the internal RAM 22.

Further, a register r0 appearing in the line 5 stores "zero" and thus the variable "i" in the external RAM 14 is initialized.

In FIG. 4D, the variable "i" stored in the external RAM 14 is assigned (viz., transferred) to the internal RAM 22 at the lines 6 and 7. In a similar manner, the variable "a3" stored in the external RAM 14 is assigned to the internal RAM 22 at the lines 8 and 9. Thereafter, the variable "i" stored in the internal RAM 14 is sent back to the external RAM 14 at the lines 20 and 21. Likewise, the variable "a3" stored in the internal RAM 14 is sent back to the external RAM 14 at the lines 26 and 27.

Figure 5:
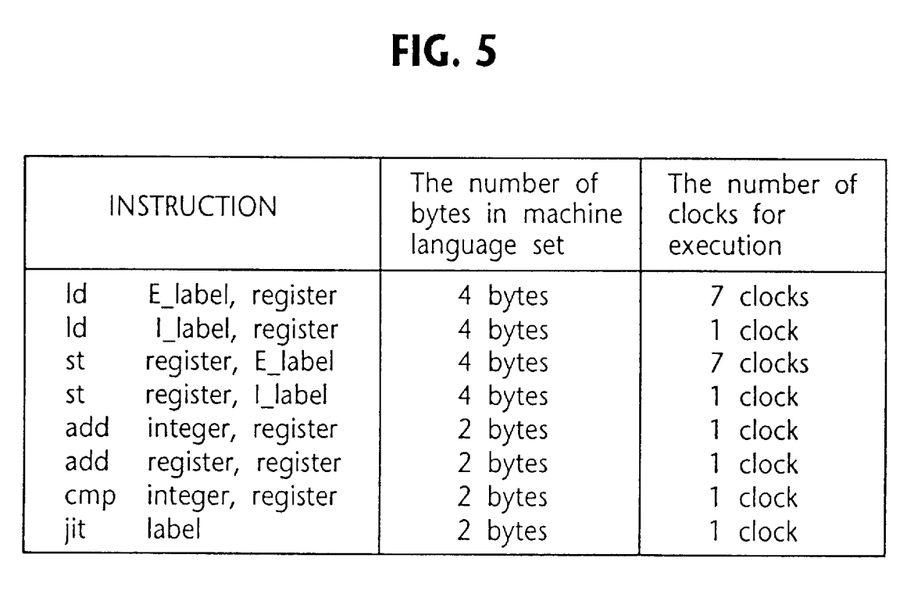
FIG. 5 is a table in which assembler codes are listed together with the number of bytes and the number of execution clocks required for corresponding assembler codes.

FIG. 5 is a table in which assembly codes are listed together with the number of bytes and the number of execution clocks required for corresponding assembler codes. As seen from the table of FIG. 5, each of the "load" and "store" executions between a variable in the external RAM 14 and a register in the microcomputer 10 takes seven (7) times clocks relative to the like executions between a variable in the internal RAM 22 and a register in the microcomputer 10.

It will be understood that the above disclosure is representative of only one possible embodiment of the present invention and that the concept on which the invention is based is not specifically limited thereto.

What is claimed is:

1. A method of assigning external variables declared in a source program to an internal RAM provided in a microcomputer when compiling said source program, said method comprising the steps of:

(a) ascertaining a number of occurrences of each external variable in a source program, and ascertaining locations of first and last occurrences of said each external variable;

(b) determining one or more external variables to be assigned to said internal RAM on a basis of the number of occurrences of each external variable; and (c) generating variable assignment information which indicates said one or more external variables assigned to said internal RAM and which indicates the locations of first and last occurrences of each external variable determined to be assigned to said internal RAM at step (b).

2. A method as claimed in claim 1, wherein said source program in step (a) has been syntactically analyzed.

3. A method as claimed in claim 1, further comprising determining one or more external variables, which are unsuitable to be assigned to said internal RAM, on a basis of the number of occurrences of said each external variable.

4. A method as claimed in claim 3, wherein if the number of occurrences of a given external variable is less than five, said given external variable is determined to be unsuitable for assignment to said internal RAM.

5. A method as claimed in claim 1, wherein a memory size available to the compiled source program within said internal RAM in checked when determining one or more external variables to be assigned to said internal RAM at step (b).

6. A method as claimed in claim 1, wherein said source program is compiled using said variable assignment information.

7. A method of assigning external variables declared in a source program to an internal RAM provided in a microcomputer when compiling said source program, said method comprising the steps of:

(a) ascertaining a number of occurrences of each external variable in a source program, and ascertaining locations of first and last occurrences of said each external variable;

(b) determining one or more external variables, which are unsuitable to be assigned to said internal RAM, on a basis of the number of occurrences of said each external variable;

(c) determining one or more external variables to be assigned to said internal RAM on a basis of the number of occurrences of each external variable; and (d) generating variable assignment information which indicates said one or more external variables assigned to said internal RAM and which indicates the locations of first and last occurrences of each external variable determined to be assigned to said internal RAM at step (b).

8. A method as claimed in claim 7, wherein if the number of occurrences of a given external variable is less than five, said given external variable is determined to be unsuitable for assignment to said internal RAM.

9. A method as claimed in claim 7, wherein a memory size available to the compiled source program within said internal RAM is checked when determining one or more external variables to be assigned to said internal RAM at step (b).

10. A method as claimed in claim 7, wherein said source program is compiled using said variable assignment information.

11. A method of assigning external variables declared in a source program to an internal RAM provided in a microcomputer when compiling said source program, said method comprising the steps of:

(a) ascertaining a number of occurrences of each external variable in a source program, and ascertaining locations of first and last occurrences of said each external variable;

(b) determining one or more external variables, which are unsuitable to be assigned to said internal RAM, on a basis of the number of occurrences of said each external variable;

(c) determining one or more external variables to be assigned to said internal RAM on a basis of the number of occurrences of each external variable and on a basis of a memory size available to the compiled source program within said internal RAM; and (d) generating variable assignment information which indicates said one or more external variables assigned to said internal RAM and which indicates the locations of first and last occurrences of each external variable determined to be assigned to said internal RAM at step (b).

12. A method as claimed in claim 11, wherein if the number of occurrences of a given external variable is less than five, said given external variable is determined to be unsuitable for assignment to said internal RAM.

13. A method as claimed in claim 11, wherein said source program is compiled using said variable assignment information.

* * * * *

UNITED STATES PATENT AND TRADEMARK OFFICE
CERTIFICATE OF CORRECTION

PATENT NO. : 6,029,003
DATED : October 30, 2000
INVENTOR(S) : Takahiro Moroda

It is certified that error appears in the above-identified patent and that said Letters Patent are hereby corrected as shown below:

Column 5, Line 12: "90" should read --80--

Column 6, Line 55, Claim 5: "in" should read --is--

Signed and Sealed this

Eighth Day of May, 2001

Attest:

NICHOLAS P. GODICI

Attesting Officer

Acting Director of the United States Patent and Trademark Office